INVENTOR.
FRANCIS A SAAS
BY
ATTORNEY

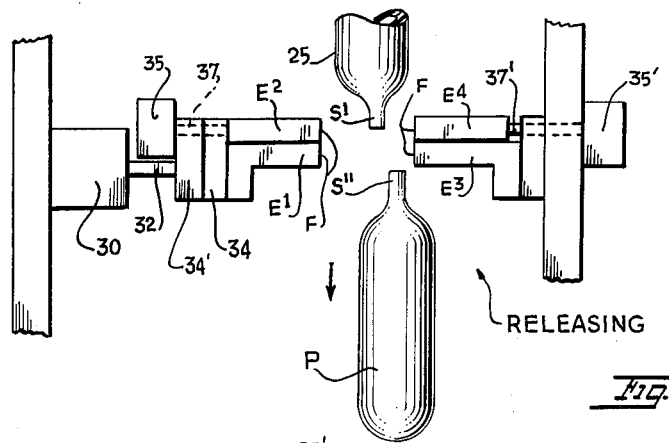
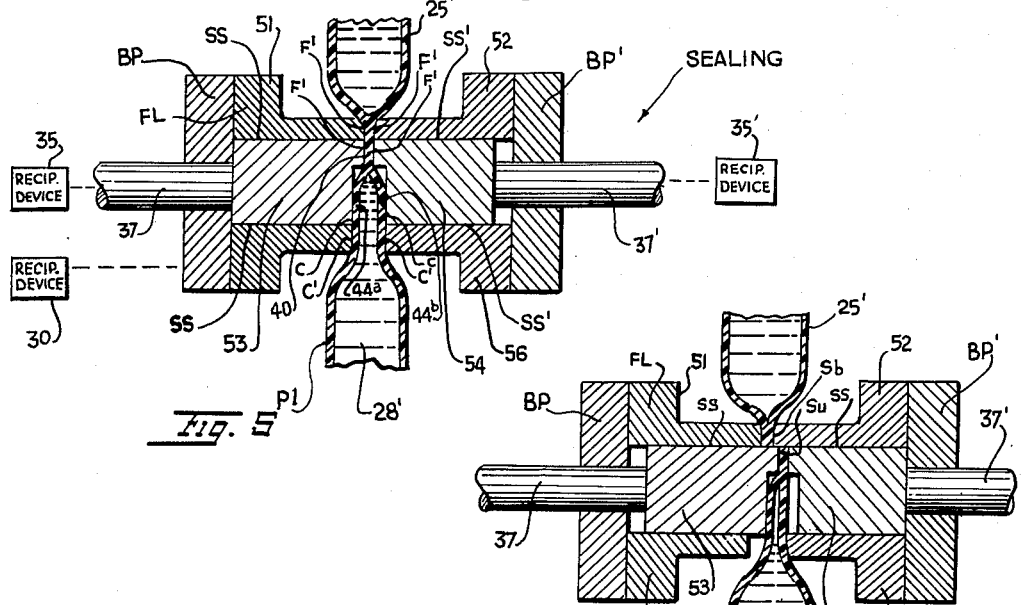
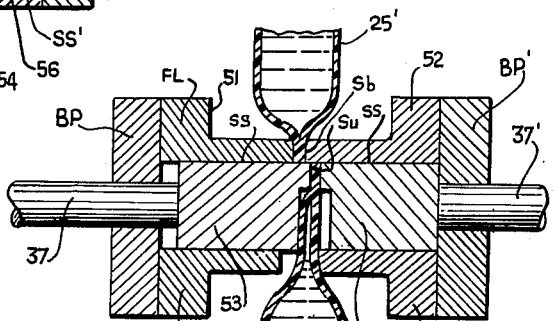
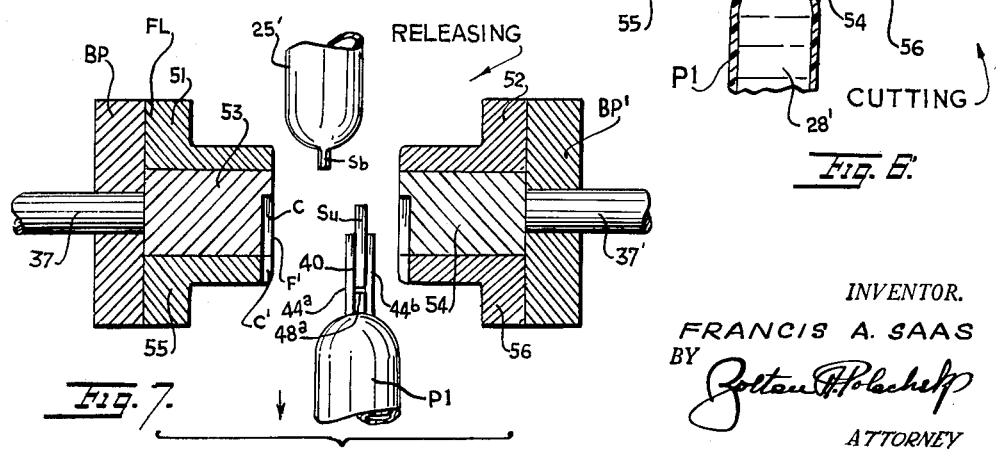

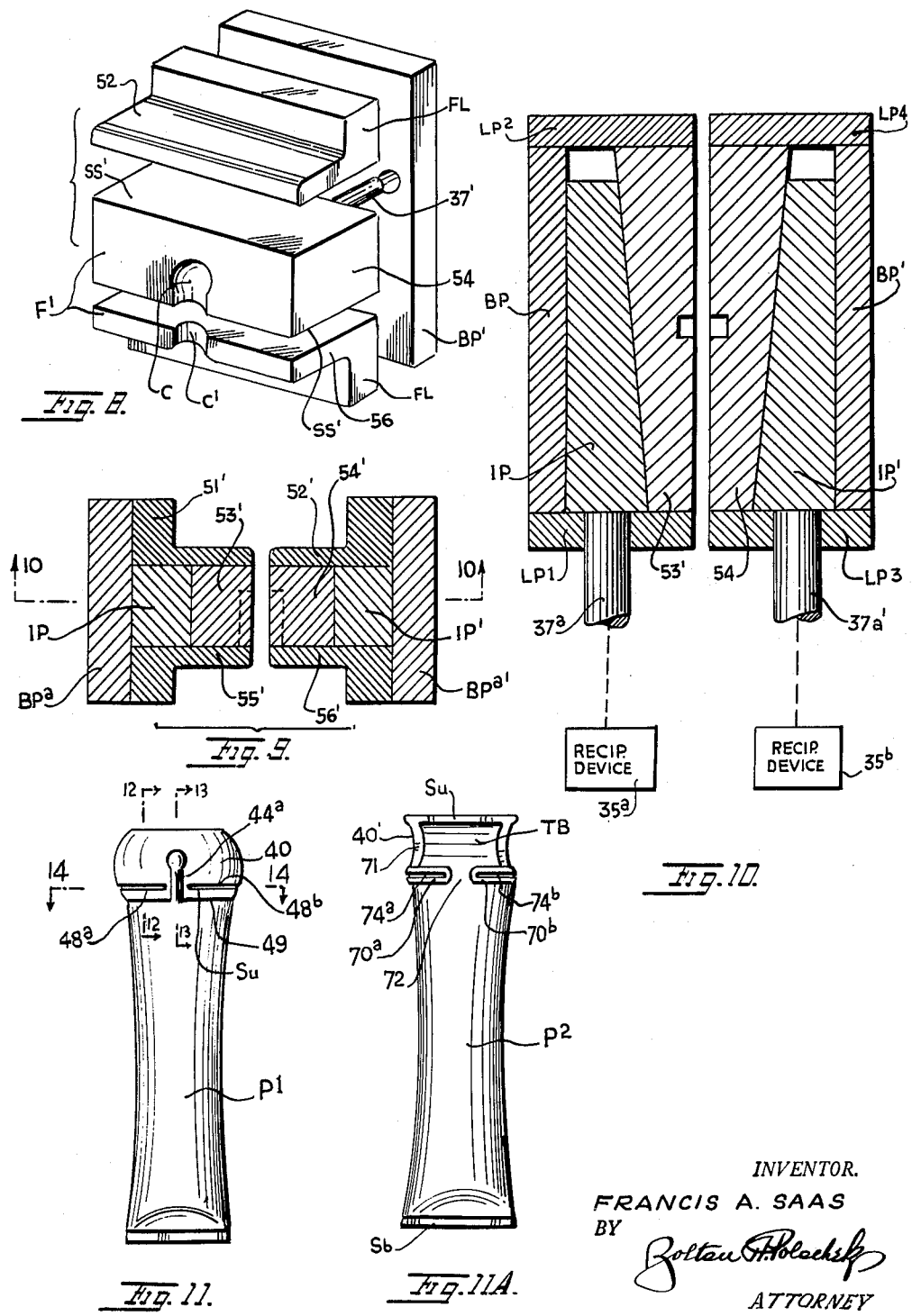

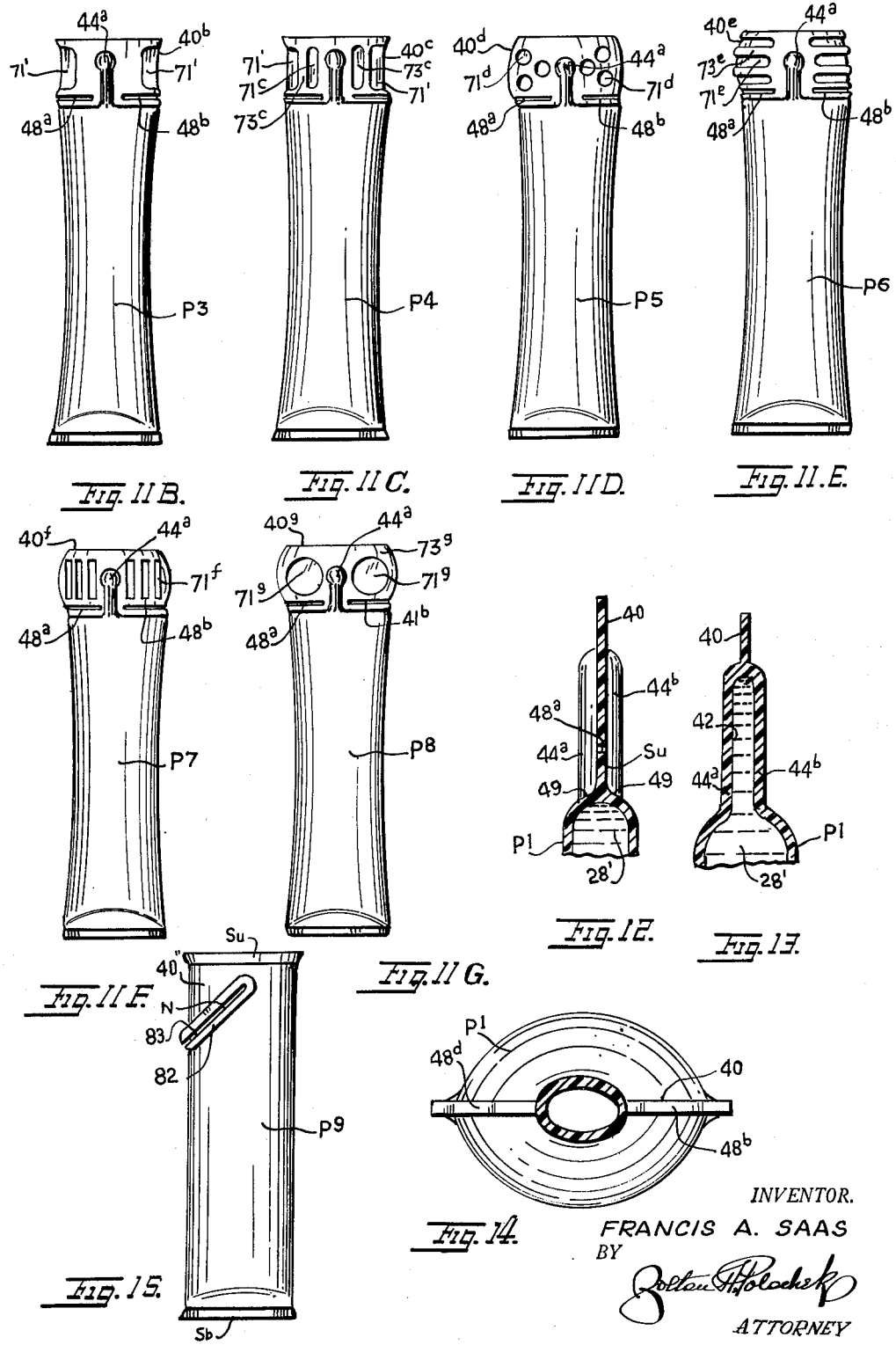

Feb. 8, 1966 FRANK SZASZ 3,234,069
NOW BY CHANGE OF NAME
FRANCIS A. SAAS
PACKAGE MANUFACTURING APPARATUS
Filed Oct. 9, 1962 6 Sheets-Sheet 5

INVENTOR.
FRANCIS A. SAAS
BY
ATTORNEY

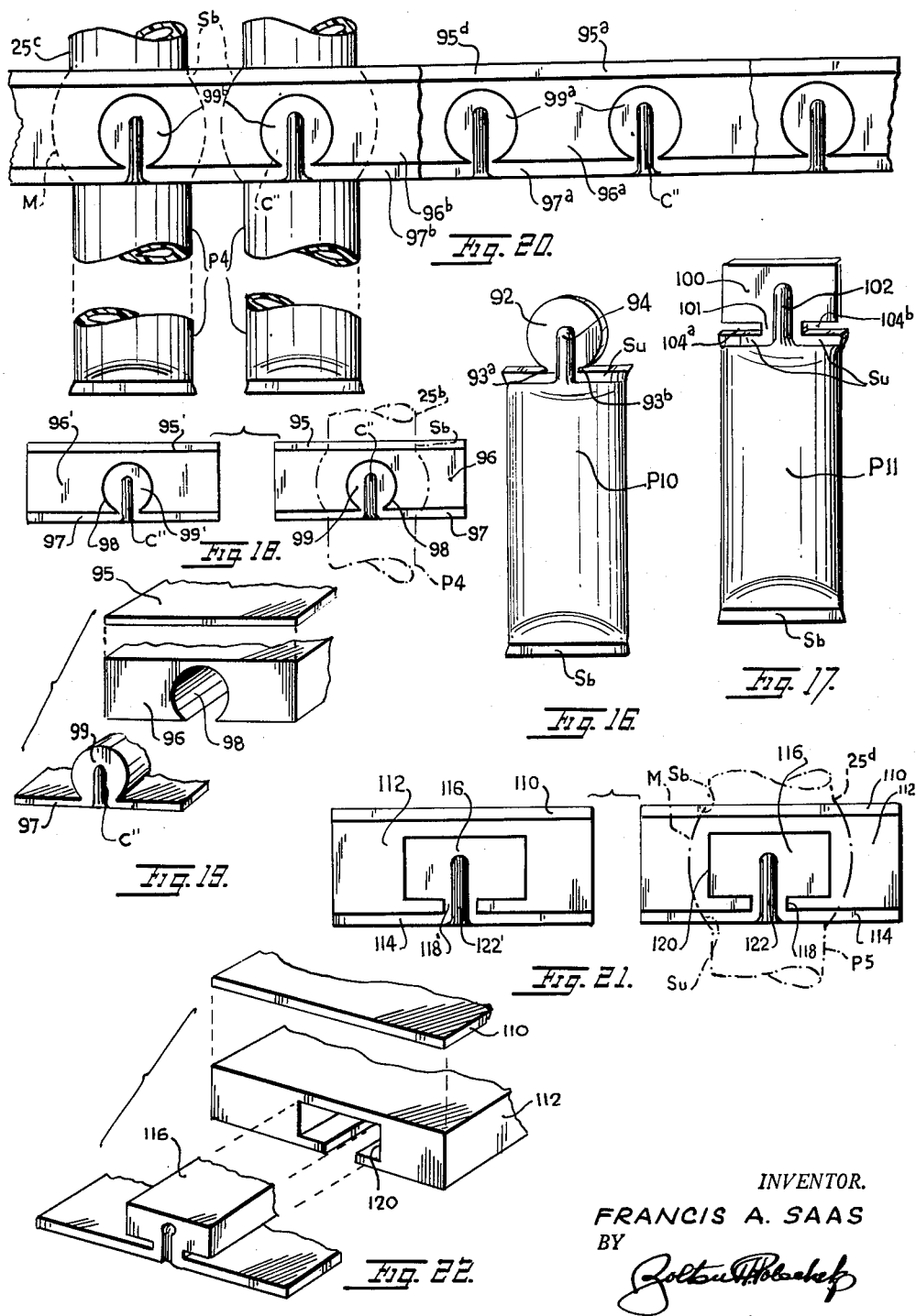

United States Patent Office 3,234,069
Patented Feb. 8, 1966

3,234,069
PACKAGE MANUFACTURING APPARATUS
Frank Szasz, now by change of name Francis A. Saas,
2407 93rd St., East Elmhurst, N.Y.
Filed Oct. 9, 1962, Ser. No. 229,401
6 Claims. (Cl. 156—380)

This invention relates to the art of package manufacture, and more particularly concerns a method and means for sealing edges of a package and for cutting the sealed edges.

Heretofore in package manufacture, it has been conventional to seal by means of electronic heat sealing electrodes the edge of a package made of weldable sheet plastic material such as polyvinyl chloride or the like. The sealed package is then transferred to a severing device for cutting off excess material from the sealed edge. It has also been known to fill a tube made of electronically weldable material with fluid, paste, powder or the like and then to form transverse welded seals in the tube to define ends of a series of joined packages. The joined packages are then transferred to a severing device for cutting the joined packages apart. The transfer of the joined packages to the severing device and the severing operation itself carried out piece-by-piece slows up production.

The present invention has as a principal object providing novel electronic heat sealing electrodes in a novel package making machine, with the sealing electrodes themselves serving as cutting devices to sever one package from another, or to sever excess material from sealed edges of the packages.

Another object is to provide novel electronic heat sealing electrodes as described, wherein the sealed packages have tearing slits formed at one end to facilitate opening of the packages by hand.

Another object is to provide novel assemblies of sealing and cutting devices for making packages.

Another object is to provide novel closing seal structures with tearing slits for liquid filled packages made of plastic material.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIGS. 1, 2, 3 and 4 are side elevational views partially diagrammatic in form, of parts of a packaging machine, shown in different positions at different steps in a package making procedure, parts of the package being shown in section.

FIGS. 5, 6 and 7 are sectional views of parts of a combined sealing and cutting tool assembly in different positions, parts of the packages also being in section; a portion of FIG. 7 shows the package parts in side elevation.

FIG. 8 is an exploded perspective view of parts of the package sealing and cutting tool assembly of FIGS. 5–7.

FIG. 9 is a sectional view of another tool assembly.

FIG. 10 is a sectional view taken on line 10—10 of FIG. 9.

FIG. 11 is a side elevational view of a package formed by the tool assembly of FIGS. 5–8.

FIGS. 11A–11G show side elevational views of other packages formed by tool assemblies similar to those of FIGS. 5–8.

FIGS. 12, 13 and 14 are sectional views on an enlarged scale taken on lines 12—12, 13—13 and 14—14, respectively, of FIG. 11.

FIGS. 15, 16 and 17 are side elevational views of other packages.

Figure 15A:
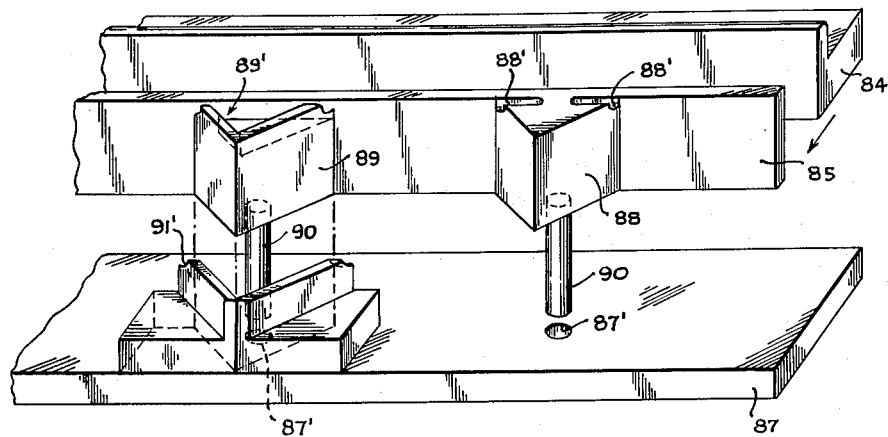

FIG. 15A is a front perspective view of a sealing and slitting assembly for making the package of FIG. 15.

FIGS. 18 and 21 are front developed elevational views of sealing and cutting tool assemblies for making the packages of FIGS. 16 and 17, respectively.

FIGS. 19 and 22 are exploded perspective views of parts of the tool assemblies of FIGS. 18 and 21, respectively.

FIG. 20 is a front elevational view of a combined sealing and cutting tool assembly, parts being broken away, for making simultaneously a plurality of packages of the type shown in FIG. 16.

Figure 1:
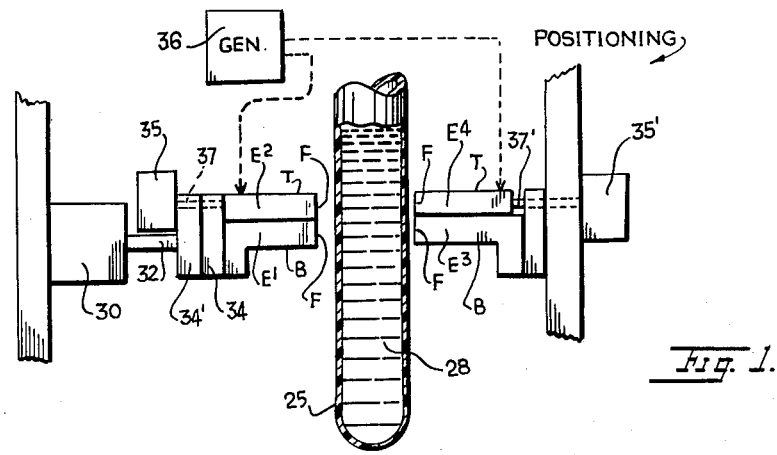
Figure 2:
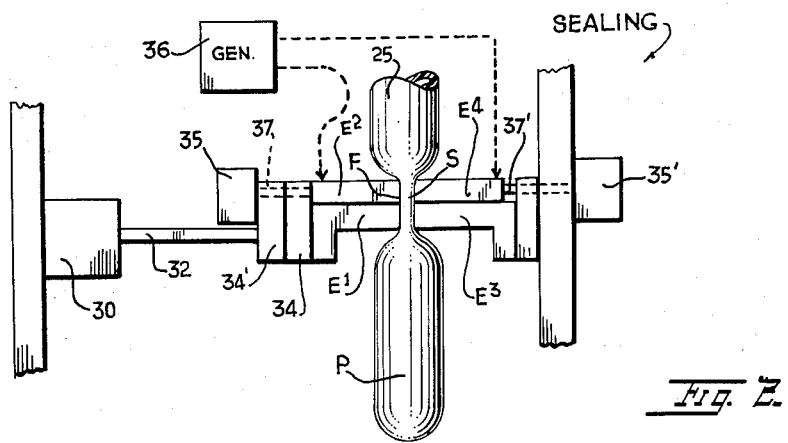

Referring first to FIGS. 1–4, there is shown a tubular container 25 formed of flexible, electronically weldable thermoplastic material. The container is filled with a fluid 28. An intermediate section S of the container is shown in FIG. 2 being pressed flat between two pairs of electrode plates E1, E2 and E3, E4. Each electrode plate is a rectangular flat member with a rectangular face F disposed at right angles to top and bottom surfaces T and B of the electrode plate. A pneumatic reciprocating device 30 engages reciprocatable rod or shaft 32 attached to metal base plate 34 common to both electrodes E1, E2 through insulation plate 34'. This device holds the electrode plates E1, E2 in juxtaposed position extended to the right as shown in FIG. 2 to press the tube 25 section S inwardly to the right. Faces F of the electrode plates E1, E2 are disposed in coplanar alignment. Electrode plates E3 and E4 are also juxtaposed to each other and their faces F are also disposed in coplanar alignment. Electronic heat sealing generator 36 is connected to the pairs of electrode plates E1, E2 and E3, E4 and provides power to heat the section S dielectrically causing the abutted sides of container 25 to fuse together forming a liquid-tight seal.

Figure 3:
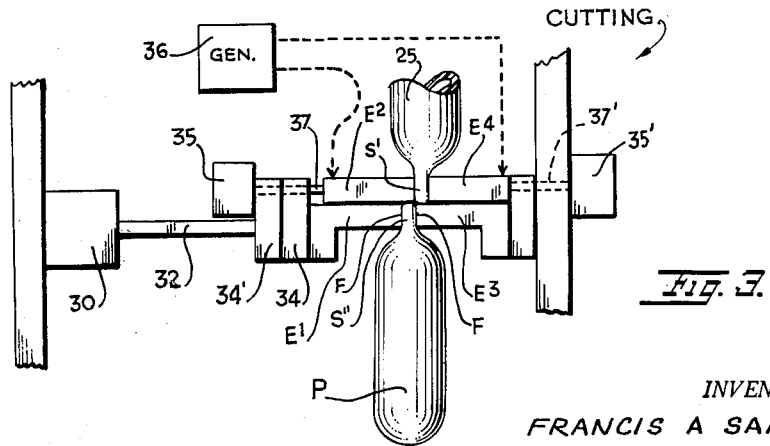

As soon as the sealing or welding step illustrated in FIG. 2 is completed, a reciprocating device 35 further advances electrode plate E2 to the right by means of rod 37 while reciprocating device 35' retracts electrode plate E4 to the right by means of shaft 37'. Electrode plates E2 and E4 are precisely coplanar. Electrode plates E1 and E3 are also precisely coplanar and are held stationary. A shearing occurs of section S to form two sealed portions S' and S". The sealed bottom edge S' is carried laterally by the moved electrode plates E2 and E4 as shown in FIG. 3. Sealed upper edge portion S" of the package P remains held between abutting faces F of the electrodes E1, E3.

The reciprocating devices 35 and 35' then simultaneously retract the pairs of electrode plates E2 and E4 to release the sealed edges S' and also to release the sealed package P, as shown in FIG. 4. Reciprocating device 30 retracts electrodes E1, E2 together as shown in FIGS. 1 and 4. The faces F of electrode plates E1, E2 are aligned by device 35 while faces F of electrode plates E3, E4 are aligned by device 35'. The parts are then ready for movement to repeat the cyclic sealing and cutting operation.

The devices 30, 35 and 35' may be driven pneumatically or hydraulically, by electromagnetic means or by any suitable mechanical arrangement. The apparatus accomplishes cutting of the sealed part of the package from the remainder of the container by the same electrode plates which perform the sealing operation. The cutting is effected efficiently since one pair of coplanar plates remain stationary while another pair of plates are moved together. The electrode plates can be made of fine tool steel to retain their cutting edges and to produce flat, uniform seals.

In FIGS. 5–8 is shown another assembly of electrode plates or members employed to form the sealed package P1 of FIGS. 11–14. Referring first to FIGS. 11–14, it will be noted that the package has a flat sealed tab 40. A passage 42 is formed in the tab inside opposing longitudinal ridges $44^a$, $44^b$ on opposite sides of the tab. Two aligned slits $48^a$, $48^b$ are formed near the bottom of the tab just above the bottom edges 49 of the tab. These slits facilitate manual twisting or tearing off of the tab 40 to lease a short tubular neck at the upper sealed edge portion $S_u$ of the package through which the contents 28' of the package can be dispensed.

The closing seal of the package P1 may be formed by the electrode plate assemblies of FIGS. 4–8. This assembly includes two electrode sets, each having contiguously contacted or juxtaposed three parallel plates 51, 53, 55 and 52, 54, 56. Each set has one base plate BP and BP'. The two outer electrode plates of each set have L-shaped cross section. These plates 51, 55 and 52, 56 are mounted permanently on the common base plates BP and BP' by means of their longitudinal flanges FL shown in FIGS. 4–8, or they may be made of one piece of metal, including the base plates. Parallel side surfaces SS of movable plate 53 are disposed in right angles to faces F' and they are coplanar with side surfaces SS' of other movable plate 54. Stationary plates 51, 55 and 52, 56 are in touching contact with movable plates 53, 54 along their side surfaces SS and SS', so the stationary plates 51, 55 are coplanar with the opposing plates 52, 56 of the other set.

Cavities C are formed in each of the electrode plates 53, 54 and cavities C' are provided in electrode plates 55, 56. Movable plates 53 and 54 have at least one rod or shaft 37 and 37' connected permanently and perpendicularly to their outer sides. These rods are connected at their other ends to separate reciprocating devices 35, 35'. The electrode sets have parallel end faces F' aligned evenly by the reciprocating devices of the movable plates.

After a first reciprocating device 30 moves at least one of the electrode sets with its three plates to abutting position with tab section 40 of container 25' disposed between the sets, as shown in FIG. 5, electronic heat will be applied to the respective electrode sets.

When the faces F' of one set of the electrode plates are aligned and abutted to aligned faces of the other set of electrode plates reciprocating device 30, as shown in FIG. 5, and electronic heating is applied, sealing of tab 40 is accomplished. Part of tab 40 is not fused and this forms the passage 42 and ridges $44^a$, $44^b$, due to cavities C, C'.

Cutting of the tab is then effected as shown in FIG. 6. Electrode plates 51, 52 and 55, 56 are held stationary while electrode plates 53, 54 are moved together to the right as shown by reciprocating devices 35, 35'. The upper edges of electrode plates 53, 54 sever the upper edge of tab 40 from the lower sealed edge $S_b$ of tube 25'. At the same time, lower edges of electrode plates 53, 54 sever the tab to form slits $48^a$, $48^b$ on opposite sides of ridges $44^a$, $44^b$, leaving the sealed edge portion $S_u$ intact.

The several electrode plates are then retracted as shown in FIG. 7 to release package $P_1$ and the bottom sealed edge $S_b$ of container 25'. The electrode plates in each set are then aligned for repeating the cycle of FIGS. 4–7.

FIGS. 9 and 10 show sectional views of an electrode assembly similar to that of FIGS. 4–8. Corresponding parts are indicated by primed numbers. Reciprocating devices 35, 35' apply severing forces via wedge-shaped plates IP, IP' to movable plates 53' and 54'. Stationary plates 51', 55' and 52', 56' correspond in shape and function to plates 51, 55 and 52, 56, respectively, described above. Base plates $BP^a$ and $BP^b$ correspond in shape and function to base plates BP and BP' of FIGS. 5–8. End plates LP1–LP4 serve to guide and limit side movements of plates 53' and 54'. Rods $37^a$ and $37^{a'}$ are connected to one side of inclined plates IP and IP'. Their other ends are connected to reciprocating devices $35^a$, $35^b$. The electrode assembly of FIGS. 9 and 10 serves to seal and sever packages P1 as shown in FIGS. 11–14.

FIGS. 11A–11G show packages P2–P8 having tabs $40^a$–$40^g$ severed by electrode assemblies such as shown in FIGS. 5–8. The end face F' of at least one of the movable plates 53 and 54 is provided with additional cavities in order to leave unsealed tab portions. The unsealed tab portions differ in thickness from the sealed portions and provide finger grips to facilitate tearing the tabs off the ends of the packages.

Package P2 in FIG. 11A has an upper sealed edge $S_u$ and a lower sealed edge $S_b$. In addition, two U-shaped seals $70^a$, $70^b$ extend transversely inwardly from outer edges of the tubular package leaving an unsealed portion 72 therebetween. Slits $74^a$, $74^b$ are formed in the respective seals $70^a$, $70^b$. These slits are disposed in alignment so that the upper part of the package forms a tab 40' which can be torn off. This will leave a short unsealed neck at portion 72 through which the fluid in the package can be dispensed. Lateral seals 71 are formed at the edges of the tab. Central portion TB is unsealed.

Packages P3–P8 in FIGS. 11A–11G are similar to package P1 and corresponding parts are identically numbered. Unsealed lateral portions 71', 72' are formed in tabs $40^b$, $40^c$ of packages P3, P4. Tab parts $71^c$ are unsealed while tabs parts $73^c$ in tab $40^c$ are sealed. Circular tab parts $71^d$ are unsealed in tab $40^d$ of package P5. Transverse tab parts $71^e$ are unsealed in tab $40^e$ while alternating transverse tab parts $73^e$ are sealed. Tab $40^f$ has longitudinal unsealed parts $71^f$. Tab $40^g$ has circular unsealed parts $71^g$ while the remainder $73^g$ of the tab is sealed.

FIG. 15 shows package P9 with upper and lower seals $S_u$ and $S_b$, and a diagonal U-shaped seal 82 near the upper seal. A slit 83 is formed in the seal 82. This defines a generally triangular tab 40" which can be torn off at slit 83 to form a dispensing opening at narrow unsealed portion N near the top of the package.

In FIG. 15A, there is shown an assembly of electrode plates or members employed to form the sealed package P9 of FIG. 15. This assembly includes a set of parallel plates 84, 85, 86, plate 86 being mounted on base plate 87. Plates 84 and 86 are stationary plates and plate 85 is a movable plate. Movable plate 85 has a triangular-shaped block 88 and a triangular-shaped die member 89 in spaced relation therealong. Shafts 90 depend from the die member 89 and block 88 and are adapted to move into and out of holes 87' formed in the base plate 87. The stationary plate 86 is formed with a triangular die member 91 aligned with the die member 89. Block 88 is formed with aligned cavities 88' in its upper surface and die member 89 is formed with cavities 89'. Die member 91 is formed with cavities 91'.

When the faces of the die members are moved to aligned and abutting relation, electronic heat is applied to the plates and sealing of the package P9 is effected. Further reciprocation of the movable plate 85 severs the tab 40" to form the slits 83 of package P9 (FIG. 15) leaving the sealed edge $S_u$ intact.

FIG. 16 shows package P10 provided with lower and upper transverse seals $S_b$ and $S_u$. The package has a tab 92 at its upper end which is flat and circular and has a diametral passage defined by opposing ridges 94. Tab 92 is circular and tangential to seal $S_u$ to define two acute angled points $93^a$, $93^b$. When the tab is manually torn off across these points a narrow neck is formed at the center of seal $S_u$ through which the contents of package P10 can be dispensed.

FIGS. 18 and 19 show an electrode plate assembly for forming the seals of package P10. Plate 95 is superimposed on the flat top of plate 96. Plate 97 has a cylindrical portion 99 tangential to plate 97 and which fits in a cylindrical passage 98 in plate 96. The top of plate 97 abuts the underside of plate 96. Plate 95' opposes plate 95 and in cooperation therewith forms seal $S_b$ in tube $25_b$. Plate 95' is superimposed on plate 96' which has a cylindrical passage 98' receiving cylindrical portion 99' disposed tangential to plate 97' underlying plate 96'. Plates 97, 97' cooperate to form seal $S_u$ in package 10. The cylindrical electrode parts 99, 99' form tab 92. The opposing faces of the cooperating cylindrical electrode parts 99, 99' have opposing recesses or cavities C'' to leave the unsealed ridges 94.

When plates 96, 96' are moved together with respect to stationary electrode plates 95, 95' and 97, 97', the circular tab 92 is cut around abutted plate portions 99, 99'.

FIG. 20 shows an assembly of electrode plates which can be used to seal and cut a plurality of containers 25C to form packages P10 as illustrated in FIG. 16. Plate $95^a$ opposes plate $95^b$. Plate $96^a$ opposes plate $96^b$ and plate $97^a$ opposes plate $97^b$. Cylindrical blocks $99^a$ are spaced uniformly along and tangential to plate $97^a$ and oppose cylindrical blocks $99^b$ spaced uniformly along and tangential to plate $97^b$. Opposing cavities C'' are formed at the several blocks $99^a$, $99^b$ and plates $97^a$, $97^b$. When the plates $95^a$, $95^b$ are abutted on opposite sides of containers 25C they form seals $S_b$ in each container. The abutting of plates $97^a$, $97^b$ along with abutting blocks $99^a$, $99^b$ form the tabs 92. These tabs are cut free from the excess material M' of the container when plates $96^a$, $96^b$ are moved simultaneously perpendicular to the lengths of the plates while abutted plates $95^a$, $95^b$ and $96^a$, $96^b$ remain stationary. This arrangement of electrode plates thus enables simultaneous sealing of a plurality of packages P10.

FIG. 17 shows package P11 provided with a rectangular tab 100 having unsealed opposing ridges 102 extending longitudinally of the tubular package, and terminating short of the top edge of the tab. Two aligned slits $104^a$, $104^b$ are formed at the bottom edge of the tab. The lower edges of the slits are formed by sealed portions $S_u$ at the upper edge of the package. When tab 100 is torn off at neck 101, a narrow opening is formed between the spaced ends of sealed portions $S_u$ at the stubs of opposing ridges 102.

FIGS. 21 and 22 show an assembly of electrode plates employed to form the seals of package P11. In one set of electrode plates, plate 110 is superimposed on plate 112. Plate 114 underlays plate 112 and has a rectangular block 116 supported by a neck section 118. The block fits into a rectangular passage or recess 120 in plate 112. A cavity 122 is formed in the flat face of plate 114 and extends through neck section 118 part way across the face of block 116. Superimposed plates 110', 112' and 114' of another set oppose plates 110, 112 and 114. Block 116' supported by neck section 118' opposes block 116 and the neck esctions 118, 118' oppose each other. Cavity 122' opposes cavity 122. When the two sets are abutted, cooperating plates 110, 110' form seal $S_b$ on container $25^d$. Cooperating plates 114, 114' form seal $S_u$ separated by ridges 102. Cooperating blocks 116, 116' form tab 100 while the neck sections 118, 118' form neck 101 of the tab. When plate 112, 112' are axially parallel to plates 110, 110' and 114, 114' which remain stationary, the seal $S_b$ is severed from the top of tab 100, and the periphery of tab 100 and neck 101 is cut free from excess material portion M' of container $25^d$.

Although most of the packages shown herein are made of flexible plastic tubing, having a transverse bottom seal and a transverse upper seal, it has to be noted that all kinds of plastic containers may be used for manufacturing packages by the described combined sealing and severing devices. Packages may be manufactured of blow-molded single containers without bottom seals; packages may be manufactured of plastic tubing, made of sheet material, having a longitudinal seal, or of two layers of sheet material having seals all around the edges of the package; but in all cases the closing seal and severing is accomplished by sealing electrodes serving as cutting devices.

There have been provided according to the invention a variety of plastic packages sealed in different ways by novel asemblies of electrode plates which serve as cooperating fusing electrodes as well as cutting devices.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. Package manufacturing apparatus, comprising first and second sets of three electrode plates each, the plates of each set being laterally juxtaposed, a first plate of the first set being movably disposed between second and third plates of the first set; a first plate of the second set being movably disposed between second and third plates of the second set, the first, second and third plates of the first set being disposed in opposing coplanar disposition with respect to the first, second and third plates respectively of the second set, the three plates of each set having flat end faces defining predetermined sealing areas; a first reciprocating device for advancing and retracting simultaneously all the plates of the first set with respect to the plates of the second set; means for applying heating energy to both sets of electrode plates, whereby portions of opposite sides of a thermally weldable tube will be fused together to form a flat seal equal in area on each side thereof to the sealing areas of the end faces when the end faces of both sets of electrode plates are abutted with said tube therebetween; a second reciprocating device for advancing and then retracting the first plate of the first set between the second and third plates of the second set while the second and third plates of both sets are stationary; and a third reciprocating device for retracting and then advancing the first plate of the second set between the second and third plates of the second set while the first plate of the first set is advancing and then retracting between the second and third plates of the second set, whereby said seal is severed between edge portions of the first plate of the first set and of the second and third plates of the second set while the first plate of the first set is advancing and the opposing first plate of the second set is retracting and while the stationary second plates of both sets engage one edge of said seal therebetween and the stationary third plates of both sets engage another edge of said seal therebetween, and whereby both edges of said seal will be released when the first reciprocating device retracts the three plates of the first set simultaneously away from the three plates of the second set.

2. Package manufacturing apparatus according to claim 1, wherein the end faces of the first and second plates of the first set have aligned first cavities therein, and the end faces of the first and second plates of the second set have other aligned cavities therein registering with the first cavities to leave an unsealed portion in said seal.

3. Package manufacturing apparatus, comprising first and second sets of three electrode plates each, the plates of each set being laterally juxtaposed, a first plate of the first set being movably disposed between second and third plates of the first set; a first plate of the second set being movably disposed between second and third plates of the second set, the first, second and third plates of the first set being disposed in opposing coplanar disposition with respect to the first, second and third plates respectively of the second set, the three plates of each set having flat end faces defining predetermined sealing areas; a first reciprocating device for advancing and retracting simultaneously all the plates of the first set with respect to the plates of the second set for engaging therebetween and then releasing opposite sides of a thermally weldable tube, whereby the opposite sides of the tube will be fused together forming a flat seal equal in area on each side thereof to the sealing areas of the end faces; a second reciprocating device for advancing and then retracting the first plate of the first set between the second and third plates of the second set while the second and third plates of both sets are stationary; and a third reciprocating device for retracting and then advancing the first plate of the second set between the second and third plates of the second set while the first plate of the first set is advancing and then retracting between the second and third plates of the second set, whereby said seal is severed between edge portions of the first plate of the first set and of the second and third plates of the second set while the first plate of the first set is advancing and the opposing first plate of the second set is retracting and while the stationary second plates of both sets engage one edge of said seal therebetween and the stationary third plates of both sets engage another edge of said seal therebetween, and whereby both edges of said seal will be released when the first reciprocating device retracts the three plates of the first set simultaneously away from the three plates of the second set.

4. Package manufacturing apparatus according to claim 3, wherein the end faces of the first and second plates of the first set have aligned first cavities therein, and the end faces of the first and second plates of the second set have other aligned cavities therein registering respectively with the first cavities, to leave an unsealed portion in said seal.

5. Package manufacturing apparatus according to claim 3, wherein the first plate of the first set has a first passage therein, the second plate of the first set having a first block formed thereon engaged in said passage and serving as a guide for movement of the first plate of the first set, the first plate of the second set having a second passage therein, the second plate of the second set having a second block engaged in said second passage and serving as a guide for the first plates of both sets, whereby said seal includes a tab connected to said one edge of the seal, said tab having a shape conforming in outline to the cross section of said first passage.

6. Package manufacturing apparatus according to claim 5, wherein the end faces of the blocks have cavities therein registering with each other to define an unsealed portion in said tab.

References Cited by the Examiner
UNITED STATES PATENTS

| | | | |
|---|---|---|---|
| 2,103,389 | 12/1937 | Salfisberg | 222—107 |
| 2,663,461 | 12/1953 | Brown | 222—107 |
| 2,852,898 | 9/1958 | Berg | 53—182 |
| 3,001,348 | 9/1961 | Rado | 53—182 |
| 3,015,600 | 1/1962 | Cook | 156—515 XR |
| 3,054,441 | 9/1962 | Gex et al. | 156—515 |
| 3,099,596 | 7/1963 | Prew | 156—515 |
| 3,106,502 | 10/1963 | Starger et al. | 156—515 |
| 3,115,564 | 12/1963 | Stacy | 156—251 |

ALEXANDER WYMAN, *Primary Examiner.*

T. E. CONDON, HAROLD ANSHER, *Examiners.*